UNITED STATES PATENT OFFICE.

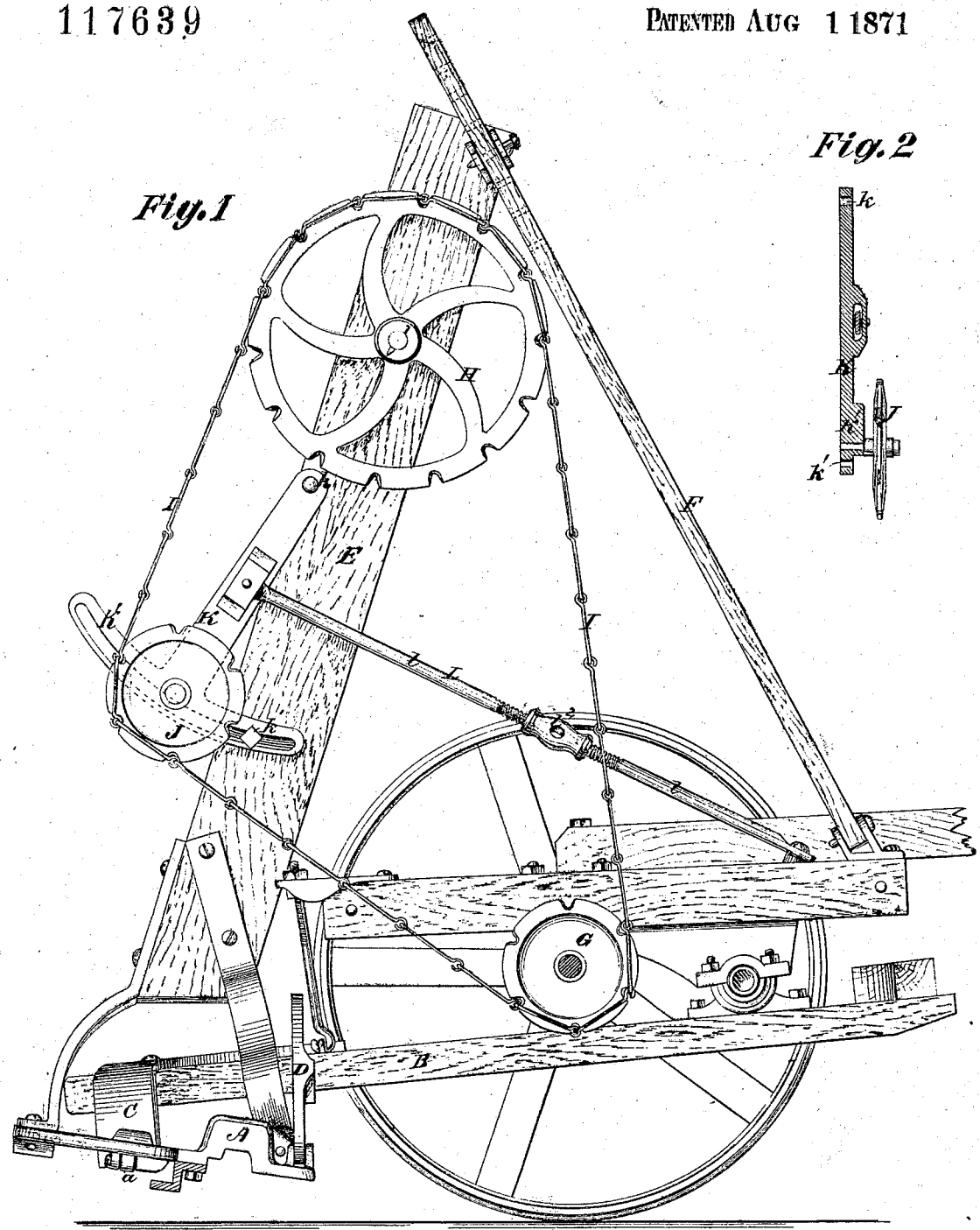

WILLIAM NEVINS JOHNSON, OF OXFORD, WISCONSIN, ASSIGNOR TO C. H. McCORMICK & BRO., OF CHICAGO, ILLINOIS.

IMPROVEMENT IN HARVESTERS.

Specification forming part of Letters Patent No. 117,639, dated August 1, 1871.

*To all whom it may concern:*

Be it known that I, WILLIAM NEVINS JOHNSON, of Oxford, in the county of Marquette and State of Wisconsin, have invented certain new and useful Improvements in Harvesters, of which the following is a specification:

My invention constitutes an improvement on the well-known "Advance" harvester manufactured by C. H. McCormick & Bro., of Chicago, Illinois. Its object is to enable the driver to raise and lower the points of the guards while reaping without stopping the machine; and the improvement consists in mounting a self-adjusting tension-pulley (over which the chain which drives the reel and rake passes) on the rake-post, as hereinafter set forth, so that the driver can raise or lower the points of the guards while reaping without stopping the reel and rake.

In the accompanying drawing, Figure 1 represents a side elevation of so much of the "Advance" harvester aforesaid as is necessary to illustrate the invention herein claimed, and Fig. 2 a vertical transverse section through the radius-bar.

The construction of this machine is so well known that a description of it here is unnecessary. It is, moreover, fully shown and described in Letters Patent No. 98,394, granted December 28, 1869, to C. H. McCormick & Brother.

The finger-beam is attached to a shoe, A, hinged to the frame B by means of a stirrup, C, and coupling-arm D. A rake-post, E, is mounted on the shoe and connected with the frame by a pivoted brace, F. A sprocket-pulley, G, on the main axle, drives a corresponding wheel, H, on the shaft of the reel and rake, by means of a chain, I. The mechanism so far referred to is that of the "Advance" machine above mentioned. In this machine, as heretofore constructed, the points of the guards could not be raised or lowered when reaping without stopping the machine, for, when this was done, the chain would tighten or slacken so much as to stop the reel and rake. In order to obviate this difficulty, I mount a tension-pulley, J, on a radius-bar, K, oscillating on a pivot, $k$, on the rake-post, and controlled by a slotted guide, K', secured to the radius-bar and working on a pin, $k'$, on the post. An extension-rod, L, is pivoted at one end to the main frame, and at the other to the radius-bar. This rod is made in two sections, $l\ l^1$, connected by a screw-coupling, $l^2$, or other well-known equivalent means of lengthening or shortening it, in order properly to adjust the tension of the driving-chain.

To raise or lower the points of the guards, the driver removes the pin from the brace-bar F and rocks the rake-post backward or forward on the rear hinge $a$ of the shoe. When the desired position is attained the brace F is refastened to the rake-post. During these movements the brace-rod keeps the tension-pulley in a uniform position relatively to the two sprocket-wheels, and thus keeps the driving-chain tight.

By this mode of construction the guards can be set higher or lower to suit the condition of the crop to be cut.

I claim as my invention—

1. The combination of the rake-post, the radius-bar oscillating thereon, the guide, the tension-pulley, and the adjustable extension rod connecting the pulley and main frame, all these members being constructed and operating, substantially as hereinbefore set forth, to adjust the position of the tension-pulley.

2. The combination of the frame, the shoe, the rake-post, the pivoted brace, the radius-bar, the sprocket-wheel and pulley, the driving-chain, the extension-rod, and the tension-pulley, all these members being constructed to operate in combination, substantially as hereinbefore set forth, to allow the driver to rock the guard-fingers while reaping without interrupting the working of the reel and rake.

In testimony whereof I have hereunto subscribed my name.

WILLIAM NEVINS JOHNSON.

Witnesses:
   FRANK ABBOTT,
   HENRY H. TAYLOR.